(12) United States Patent
Bahon et al.

(10) Patent No.: US 11,254,820 B2
(45) Date of Patent: *Feb. 22, 2022

(54) PROCESS FOR MANUFACTURING BORON NITRIDE AGGLOMERATES

(71) Applicant: SAINT-GOBAIN CERAMICS & PLASTICS, INC., Worcester, MA (US)

(72) Inventors: Elodie Bahon, Salon de Provence (FR); Pierre-Loup Judas, Saint-Germain-au-Mont-D'Or (FR); Nabil Nahas, Mougins (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/693,178

(22) Filed: Nov. 22, 2019

(65) Prior Publication Data

US 2020/0087517 A1     Mar. 19, 2020

Related U.S. Application Data

(63) Continuation of application No. 15/608,509, filed on May 30, 2017, now Pat. No. 10,526,492.

(Continued)

(51) Int. Cl.
   *C01B 21/064* (2006.01)
   *C09C 1/00* (2006.01)
   (Continued)

(52) U.S. Cl.
   CPC .......... *C09C 1/0081* (2013.01); *B28B 11/243* (2013.01); *C01B 21/0648* (2013.01);
   (Continued)

(58) Field of Classification Search
   None
   See application file for complete search history.

(56) References Cited

U.S. PATENT DOCUMENTS

| 4,412,008 A | 10/1983 | Miyamoto et al. |
| 4,846,409 A | 7/1989 | Kaspar et al. |

(Continued)

FOREIGN PATENT DOCUMENTS

| CN | 103958400 A | 7/2014 |
| JP | S56120575 A | 9/1981 |

(Continued)

OTHER PUBLICATIONS

Sigma Aldrich Online Product Catalog; Evidentiary Reference; http://www.sigmaaldrich.com/catalog/product/aldrich/255475?lang=en&region=US. Boron nitride data.

(Continued)

*Primary Examiner* — Richard A Huhn
(74) *Attorney, Agent, or Firm* — Abel Schillinger, LLP; Adrian Lawrence

(57) ABSTRACT

Disclosed are methods for forming boron nitride-containing aggregates that exhibit improved wear by attrition, and resulting filled polymers that exhibit significantly improved thermal conductivity. The boron nitride-containing aggregates are prepared according to a method that includes wet granulating boron nitride powder with a granulation solution to form wet boron nitride-containing granules; and drying the wet boron nitride-containing granules to cause evaporation of solvent in the granulation solution, thereby forming boron nitride-containing granules. Sintering achieves the desired boron nitride-containing aggregates.

20 Claims, 1 Drawing Sheet x300     300 um

Related U.S. Application Data

(60) Provisional application No. 62/342,245, filed on May 27, 2016.

(51) Int. Cl.

| | | |
|---|---|---|
| *C09C 3/04* | (2006.01) | |
| *C08K 3/38* | (2006.01) | |
| *B28B 11/24* | (2006.01) | |
| *C04B 35/583* | (2006.01) | |
| *C04B 18/02* | (2006.01) | |
| *C04B 35/626* | (2006.01) | |
| *C04B 35/632* | (2006.01) | |
| *C04B 38/00* | (2006.01) | |
| *C04B 35/634* | (2006.01) | |
| *B01J 2/10* | (2006.01) | |

(52) U.S. Cl.
CPC ............ *C04B 18/02* (2013.01); *C04B 35/583* (2013.01); *C04B 35/6262* (2013.01); *C04B 35/6263* (2013.01); *C04B 35/62635* (2013.01); *C04B 35/62655* (2013.01); *C04B 35/62675* (2013.01); *C04B 35/62695* (2013.01); *C04B 35/632* (2013.01); *C04B 35/634* (2013.01); *C04B 38/009* (2013.01); *C08K 3/38* (2013.01); *C09C 3/045* (2013.01); *B01J 2/10* (2013.01); *C01P 2006/80* (2013.01); *C04B 2235/3217* (2013.01); *C04B 2235/3224* (2013.01); *C04B 2235/3232* (2013.01); *C04B 2235/3418* (2013.01); *C04B 2235/3895* (2013.01); *C04B 2235/5296* (2013.01); *C04B 2235/5427* (2013.01); *C04B 2235/5436* (2013.01); *C04B 2235/608* (2013.01); *C04B 2235/72* (2013.01); *C08K 2003/385* (2013.01)

(56) References Cited

U.S. PATENT DOCUMENTS

| | | |
|---|---|---|
| 4,904,625 A | 2/1990 | Shaffer |
| 5,681,883 A | 10/1997 | Hill et al. |
| 9,822,294 B2 | 11/2017 | Yamazaki et al. |
| 10,280,284 B2 * | 5/2019 | Nahas .................... C04B 26/32 |
| 2003/0073769 A1 | 4/2003 | Pujari et al. |
| 2003/0165611 A1 | 9/2003 | Chiavazza et al. |
| 2008/0076856 A1 | 3/2008 | Zhong et al. |
| 2009/0130580 A1 * | 5/2009 | Dojo .................... G03G 9/0819 |
| | | 430/106.1 |
| 2009/0304943 A1 | 12/2009 | Gollob et al. |
| 2011/0319492 A1 | 12/2011 | Luber et al. |
| 2012/0046387 A1 | 2/2012 | Chu et al. |
| 2012/0282469 A1 | 11/2012 | Nahas |
| 2015/0137026 A1 | 5/2015 | Engler et al. |
| 2016/0060112 A1 | 3/2016 | Nishi et al. |
| 2016/0368769 A1 * | 12/2016 | Kurokawa .......... C01B 21/0646 |
| 2017/0362440 A1 | 12/2017 | Bahon |

FOREIGN PATENT DOCUMENTS

| | | |
|---|---|---|
| JP | S60145963 A | 8/1985 |
| WO | 2008/0088774 A2 | 7/2008 |
| WO | 2014/0136959 A1 | 9/2014 |
| WO | 20160203164 A1 | 12/2016 |
| WO | 2017205873 A1 | 11/2017 |

OTHER PUBLICATIONS

Shanmugam, "Granulation Techniques and Technologies: Recent Progress, "BioImpacts, 5(1):55-63 (2015).
International Search Report and the Written Opiion for International Patent Application No. PCT/US17/35010 (dated Aug. 24, 2017).

\* cited by examiner

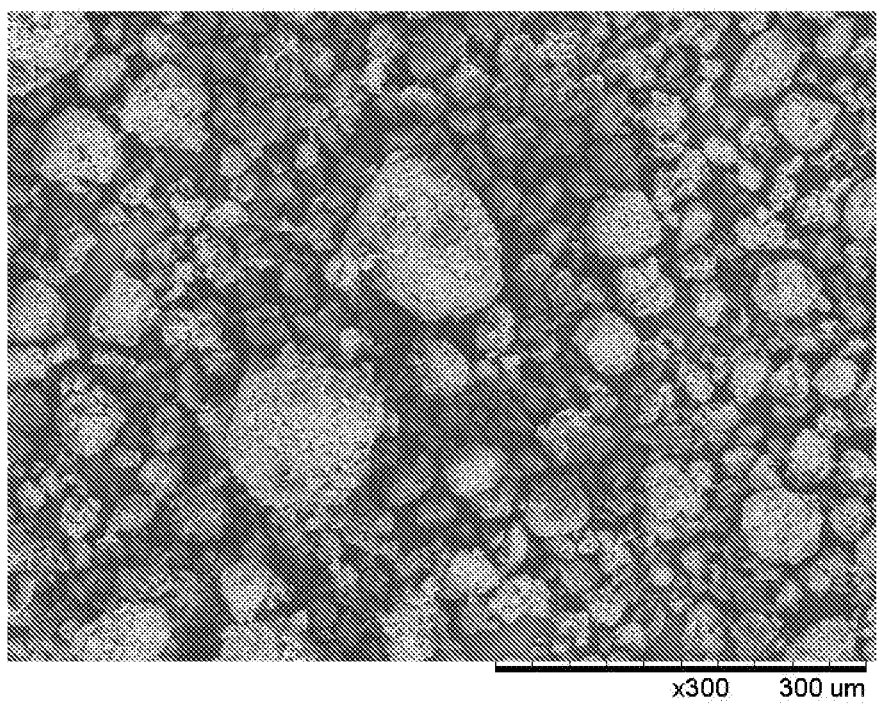

PROCESS FOR MANUFACTURING BORON NITRIDE AGGLOMERATES

CROSS-REFERENCE TO RELATED APPLICATION

This application is a continuation application of and claims priority under 35 U.S.C. § 120 to U.S. patent application Ser. No. 15/608,509, entitled "PROCESS FOR MANUFACTURING BORON NITRIDE AGGLOMERATES", by Elodie BAHON et al., filed May 30, 2017, which claims priority under 35 U.S.C. § 119(e) to U.S. Patent Application No. 62/342,245, entitled "PROCESS FOR MANUFACTURING BORON NITRIDE AGGLOMERATES," by Elodie BAHON et al., filed May 27, 2016, of which both applications are assigned to the current assignee hereof and incorporated herein by reference in their entireties.

FIELD OF THE INVENTION

The present invention relates to boron nitride-containing granules (agglomerates), powders containing sintered boron nitride-containing aggregates, and polymer compositions containing those powders. Methods of making the boron nitride-containing granules and powders, and polymer compositions containing the same are also disclosed herein.

BACKGROUND OF THE INVENTION

The use of powders of mineral particles as filler in polymers is well known in the prior art, this filler making it possible to provide additional functionalities depending, in particular, on the properties of the material constituting the filler. These functionalities are, for example, increasing the thermal conductivity and/or the hardness and/or the density of the polymer. The filled polymers thus obtained are used, in particular, in numerous technical fields such as thermal interface materials, for example, thermal pastes or thermal dissipaters, or printed circuit cards.

Due to its high thermal conductivity and electrical resistivity, boron nitride (BN) powders are used in thermal management systems. Among other publications, US 2003/0073769, US 2008/0076856, WO 2008/088774 and WO 2014/136959 describe such uses. The use of a BN powder is known particularly for increasing the thermal conductivity of the polymer, which is particularly desired in thermal interface material applications, such as thermal pastes.

To improve the through plane conductivity and reduce the anisotropy of its properties, BN is used as agglomerates or spherical powder, in the range 20-500 microns. The challenge is to develop a high strength and low cost agglomerates. Two processes currently used in the industry are: (i) isostatic pressing, crushing, sieving, and firing, which suffers from low yield and high costs; and (ii) dispersing, spray-drying, and firing, which leads to spherical granules presenting very low density and relatively low strength.

There is a need for a process allowing the manufacturing of BN agglomerates presenting the following properties: yield in the range 50-500 micron above 80%, sphericity above 0.8, and improved wear resistance (i.e., low wear by attrition).

The present invention is directed to overcoming these and other deficiencies in the art.

SUMMARY OF THE INVENTION

A first aspect of the invention relates to a method for forming boron nitride-containing granules that includes wet granulating boron nitride powder with a granulation solution to form wet boron nitride-containing granules; and drying the wet boron nitride-containing granules to cause evaporation of solvent in the granulation solution, thereby forming boron nitride-containing granules.

A second aspect of the invention relates to a boron nitride aggregate powder that comprises boron nitride-containing aggregates prepared according to the first aspect of the invention.

A third aspect of the invention relates to a composition comprising a polymer and a boron nitride aggregate powder according to the second aspect of the invention.

As demonstrated by the accompanying Examples, the wet granulation process of the invention is capable of achieving aggregate BN powder and filled polymer comprising the powder with improved characteristics. In particular, the wear by attrition of the aggregate BN powder is much lower than the wear by attrition of prior art powders, and the thermal conductivity of the filled polymer is significantly improved.

BRIEF DESCRIPTION OF THE DRAWING

FIG. 1 is an image of BN granules prepared in accordance with Example 6, using a granulation solution containing polyethylene glycol 20M and Tergitol NP10, and boron nitride powder (PUHP30005, Saint-Gobain). The image illustrates the dried BN granules prior to firing.

DETAILED DESCRIPTION OF THE INVENTION

One aspect of the present invention relates to a method for forming boron nitride-containing granules. The method includes wet granulating boron nitride (BN) powder with a granulation solution to form wet boron nitride-containing granules, and drying the wet boron nitride-containing granules to cause evaporation of solvent in the granulation solution, thereby forming boron nitride-containing granules. The granules are basically agglomerates of the particles used during wet granulation. Firing (or sintering) at elevated temperature, as described hereinafter, affords BN- or BN/hybrid aggregates.

The resulting boron nitride-containing aggregates are particularly desirable, because in comparison to boron nitride-containing aggregates formed by different processes, including those formed by (i) fluidized spray drying and (ii) dry granulation with milling, the resulting boron nitride-containing aggregates have high sphericity, high density/strength, low porosity, or a combination of two or more of these attributes. In addition, the resulting boron nitride-containing aggregates have a high yield of aggregates within the desired size-range of less than about 500 microns, particularly between about 50 and about 500 microns, or between about 50 and about 400 microns. Yields in excess of 50% can be obtained using the process as disclosed herein. In preferred embodiments, yields in excess of 60%, 65%, 70%, 75%, or 80% can be obtained using the process as disclosed herein. Improved properties for both unfired and fired boron nitride-containing granules/aggregates can be achieved.

Wherever the word "about" is employed herein in the context of dimensions (e.g. particle sizes, and weights), amounts (e.g. relative amounts of individual constituents in a composition or a component of a composition, including ratios of such constituents or components), temperatures, pressures, times, or concentrations, it will be appreciated that such variables are approximate and as such may vary by ±10%, for example ±5%, ±4%, ±3%, ±2%, or ±1% from the numbers specified herein.

"Aggregate" is understood to mean a group of particles including BN, said particles being assembled together and strongly linked rigidly, in particular by sintering, so as to constitute the individualized grains referred to as aggregates, which constitute said powder.

On the other hand, "agglomerate" is understood to refer to an assembly of particles that are weakly linked and readily dispersible.

"Consisting essentially" is understood to mean that the very large majority of said powder consists of said boron nitride-based aggregates or mixed-composition aggregates, but without excluding the presence of particles that are not boron nitride-based aggregates, such as boron nitride elementary particles, which are however necessarily present in very small quantity. More particularly, it is understood that the powder contains more than 90% by weight, preferably more than 95% by weight, or even more than 99% by weight of said boron nitride-based aggregates. Naturally, according to a possible embodiment, the powder consists only of boron nitride-based aggregates, except for the inevitable impurities.

The process of the present invention relies on the use of starting materials including BN powder; optionally an additional powder material such as a metal oxide powder, or precursor of metal oxide (in powder form), in which case the resulting BN-containing granules are hybrid granules (i.e., containing both BN and the metal oxide); and a granulation solution that is used during the wet granulation step. These materials are separately discussed below.

Boron nitride (BN), a manufactured ceramic, has excellent heat conductivity, chemical stability, electrical insulation, inertness, and machinability. Boron nitride powders are synthesized using a number of boron sources, including but not limited to boron oxide, borax, boric acid, and calcium hexaboride. BN powders are available with varying purity levels. The powder may contain impurities such as boron oxide, carbon, oxygen, metals, and other impurities. BN powders are commercially available from a number of sources, including Saint-Gobain (Amherst, N.Y.).

Mechanical, thermal and dielectric properties of the resulting BN-containing granules can be influenced by levels of initial impurities, such as oxygen. For certain applications, the presence of oxygen is detrimental to the quality of the BN-containing granules, and for other applications the presence of oxygen may be beneficial.

In one embodiment, the initial BN powder includes powder grains of BN having an oxygen content of less than or equal to 10% by weight, a calcium content of less than about 1000 ppm by weight, or both.

In another embodiment, the initial BN powder includes powder grains of BN having an oxygen content of less than or equal to 5% by weight, a calcium content of less than about 600 ppm by weight, or both.

The composition of the initial BN powder may be adjusted according to the desired resulting granule properties, including but not limited to: density, sphericity, size and final composition.

In certain embodiments, only BN powder is introduced during the wet granulation step. In these embodiments, the BN powder is essentially free of metallic or semi-conductor material and, hence, the resulting wet boron nitride-containing granules are free or essentially free of metallic or semi-conductor materials. See U.S. Patent Application Publ. No. 20090304943 for a description of thermal spraying using a free flowing agglomerate containing a ceramic component that sublimes (such as boron nitride), a metallic or semi-conductor material that does not sublime, and a binder.

Where hybrid BN-containing granules are desired, the optional metal oxide powder, or precursor of metal oxide, is also introduced before or during the wet granulation step. Exemplary metal oxide powders include, without limitation, $SiO_2$, $Al_2O_3$, $TiO_2$, and rare earth oxide powders, as well as combinations of any two or more thereof. Powdered forms of $SiO_2$, $Al_2O_3$, $TiO_2$, and rare earth oxides are commercially available from a number of sources.

In one embodiment of the present invention, the weight ratio of BN powder to metal oxide powder is between about 0.1:1 to about 10:1. In other embodiments the weight ratio of BN powder to metal oxide powder may be between about 1:1 to about 10:1.

When hybrid BN granules are desired, the BN powder and metal oxide powder can optionally be dry mixed prior to the wet granulation step. Dry mixing can be carried out for any suitable period of time, e.g., about 5 minutes up to about 60 minutes, or longer if desired.

In alternative embodiments, no dry mixing is carried out when using two or more powder materials during the wet granulation step. In this embodiment, any mixing of the two or more powders occurs during the wet granulation step.

The granulation solution is any liquid that is suitable to wet the initial BN powder (or mixture of powders). The granulation solution includes a solvent and may optionally contain additional components, including but not limited to surfactants and binders.

The granulation solution can be formed prior to the step of wet granulating by combining the solvent and the additional components in desired amounts. Alternatively, the granulation solution can be formed in situ during the step of wet granulating by combining with the powder materials, in any desired order, the solvent and optional binders and surfactants. Thus, binder and surfactant can be added to the powder before or during the wet granulation step, either separately from the solvent or with the solvent.

The solvent comprises any materials that can be used in liquid or vapor forms, which can partially or wholly dissolve any additional components of the granulation solution, and which can be wholly or partially removed by drying, firing, or a combination of both drying and firing. Exemplary solvents include, without limitation, water, organic solvents, and meltable binders.

In one embodiment, the granulation solution comprises water as the solvent, a surfactant, and a binder. In other embodiments, the granulation solution can optionally comprise an organic solvent that is sufficiently soluble in water.

Surfactants are compounds that lower the surface tension between two liquids or between a liquid and a solid. Surfactants may act as detergents, wetting agents, emulsifiers, foaming gents, and dispersants. In wet granulating, a surfactant may be used in the granulation solution or, as noted above, introduced separately during the step of wet granulation.

In one embodiment of the present invention, the surfactant is a non-ionic surfactant. Exemplary classes of non-ionic surfactants include, without limitation, alkoxylated (alkyl)phenols, polycarboxylic acids, silanes, and organometallic compounds. Commercially available members of these exemplary classes are nonylphenol ethoxylate, polycarboxylic acids (e.g., Rhodaline 111M™ available from Rhodia, Inc., Cranbury, N.J.), silanes (e.g., Z-6040 Silane™ available from Dow Chemical, Midland Mich.), and organometallic compounds (e.g., APG™ available from Cavedon Chemical Co., Woonsocket, R.I.).

In one embodiment of the present invention, the granulation solution contains between about 0.1 to about 5.0 percent (by weight) surfactant, between about 0.2 to about 4 percent (by weight) surfactant, or between about 0.3 to about 2 percent (by weight) surfactant.

Binders are any material used to facilitate the agglomeration of wet mass by adhesion. In wet granulating, a binder may be used in the granulation solution or, as noted above, introduced separately during the step of wet granulation.

Exemplary binders include, without limitation, polyethylene glycol, polyvinylalcohol, latex, silicone oil, and epoxy resin.

In one embodiment of the present invention, the granulation solution contains between about 1.0 to about 10.0 percent (by weight) binder, between about 1.0 to about 5.0 percent (by weight) binder, or between about 1.0 to about 4.0 percent (by weight) binder.

Wet granulation is a process by which small particles are converted into agglomerates, and is achieved by bringing the initial powder particles in intimate contact with a granulation solution with or without a binder. This step can be carried out using, e.g., high or low shear mixers, high or low speed mixers, fluidized bed granulators, tumbling drums or extruders, or a combination thereof.

Wet granulation processes include but are not limited to: reverse wet granulation, steam granulation, moisture-activated dry granulation, thermal adhesion granulation, and melt granulation (see Shanmugam, "Granulation techniques and technologies: recent progress," *BioImpacts*, 5(1):55-63 (2015), which is hereby incorporated by reference in its entirety) as well as extrusion and high/low shear granulation.

In one embodiment of the present invention, wet granulating is carried out using a high sheer mixer. High shear mixers disperse or transport one phase or ingredient into a main continuous phase, with which it might normally be immiscible, and vary in design and configuration. Generally, a moving rotor and/or impeller, a group of rotors and/or impellers, or a series of rotors and/or impellers, together with a stationary component is used to create shear. High shear mixers may be designed as in-line units, batch units, or a combination thereof, and may use various configurations, including but not limited to: rotor-stator teethed, blade-screen, radial-discharged or axial-discharged.

Wet granulating carried out using high shear mixers may be carried out using any of a variety of mixing speeds, whether the mixing speed is varied over the duration of the wet granulation step or maintained constant for the duration of the wet granulation step. In one embodiment of the present invention, wet granulating is carried out using an impeller radial speed of at least about 15 meters per second (m/s), or between about 20 m/s up to about 30 m/s.

The wet granulation step can be carried out for any suitable length of time, which is sufficient to result in agglomerates or granules falling within a particular size profile. In one embodiment of the present invention, wet granulating is carried out for up to about 60 minutes. In other embodiments, wet granulating is carried out for up to about 30 minutes, up to about 20 minutes, up to about 15 minutes, or up to about 10 minutes. Wet granulating steps carried out for anywhere from about 1 to about 10 minutes is also contemplated.

The ratio of the granulation solution to powder fraction may vary. Desirably, under most circumstances, the amount of granulation solution introduced during the wet granulation step should not form a slurry.

In one embodiment of the present invention, wet granulating is carried out with a liquid:solids ratio (by volume) of between about 0.1:1 to about 1:1, about 0.2:1 to about 1:1, about 0.2:1 to about 0.6:1, or about 0.3:1 to about 0.55:1. In certain embodiments, a liquid:solids ratio (by volume) of between about 0.1:1 to about 0.5:1 can be used. As used herein, the liquid:solids ratio refers to the total amount of liquid by volume to the total amount of powder by volume used during the wet granulation step. As discussed below, the granulation solution may be added over the course of time during the wet granulation step, in which case the ratio at the beginning would differ from the ratio that exists at the end of the wet granulation step. As such, reference to the total or final liquid:solids ratio is contemplated.

Where the powder materials introduced during the wet granulation step include both BN powders and metal oxide powder, or precursor of metal oxide, liquid:solids ratios falling within the ranges of the preceding paragraph can be employed.

As an alternative measure of the liquid:solids ratio, a liquid to powder pore volume ratio can alternatively be used. In certain embodiments, wet granulating is carried out with a liquid:powder pore volume of about 0.2:1 to about 2:1, about 0.4:1 to about 1.5:1, or about 0.5:1 to about 1:1.

Addition of the granulation solution to the powder fraction, i.e., BN powder or powder mixtures, may happen immediately prior to wet granulating, periodically during wet granulating, or at any rate during wet granulating. In one embodiment of the present invention, the granulation solution is introduced continuously to the BN powder (or powder mixture) during the wet granulating step. For example, the granulation solution can be introduced continuously for a first period of time followed by continued wet granulation for a second period of time without the introduction of additional granulation solution. Alternatively, the granulation solution can be introduced continuously and then the wet granulation processed halted immediately (i.e., within 1 minute) following completion of the granulation solution introduction.

Following the wet granulating step and prior to drying, the sphericity and density of granules may be improved by the addition of an optional powder dusting step. Powder dusting involves mixing the granulated wet agglomerates at reduced speed while introducing additional BN powder, metal oxide powder (or precursor thereof), or a mixture of BN and metal oxide (precursor) powders. By way of example, reduced speed of the mixing process contemplates an impeller speed of not more than about 10 m/s, or between about 1 and about 10 m/s.

One example of the powder dusting step contemplates low speed mixing of the wet boron nitride-containing granules with dry boron nitride powder, dry metal oxide powder, or a mixture of such powders.

Another example of the powder dusting step contemplates low speed mixing of the wet boron nitride/metal oxide-containing granules with dry boron nitride powder, dry metal oxide powder, or a mixture of such powders.

Following wet granulating (with or without the powder dusting step), the mixture is dried. Drying can take place under any condition that allows the solvent of the granulation solution to be wholly or partially removed. Preferably, the dried product is essentially free of the solvent used to form the granulation solution. By "essentially free", it is contemplated that the solvent content of the dried granules is less than about 2 percent, less than about 1.5 percent, less than 1 percent, less than about 0.5 percent, or less than about 0.1 percent.

Drying conditions, including but not limited to temperature, time duration, and atmospheric conditions, such as pressure and medium, may be constant or may be adjusted throughout the process. For example, drying may be carried out for several hours to overnight. Drying can be achieved by exposing the agglomerate material to infrared heating, microwave heating, reduced pressure (vacuum) environment, or a combination thereof.

In one embodiment of the present invention, the drying process includes drying at a first temperature for a first period of time and firing (or sintering) the initially dried product at a second temperature for a second period of time. In one embodiment, drying at the first temperature is between about 20° C. and about 200° C., and it is carried out overnight. In one embodiment, firing is carried out in inert or partially reducing atmosphere at a temperature of between about 1600° C. and about 2200° C., and it is carried out for at least one hour. Thereafter, the resulting fired product, the BN-containing aggregates or hybrid BN/metal oxide aggregates, can be cooled gradually to room temperature.

In an alternative embodiment, the drying and firing steps can be carried out successively during the ramp up phase and subsequent firing (or sintering) phase of the firing process.

Depending on the process parameters employed during the wet granulation steps, certain properties of the resulting BN-containing aggregates can be controlled, including sphericity, density/strength, porosity, size variation, and yield. If desired, however, the resulting sintered aggregates can optionally be subjected to grinding to obtain particle sizes within a particularly preferred size range, with particle size selection as is well known in the art.

Further, as noted above, the level of impurities in the starting BN powder can affect the properties of the final (fired) BN aggregates. In one embodiment, the fired BN aggregates have an oxygen content of less than or equal to 2% by weight, a calcium content of less than 400 ppm by weight, or both. In another embodiment, the fired BN aggregates have an oxygen content of less than 1.5% by weight, a calcium content of less than 300 ppm by weight, or both.

In one embodiment, the resulting powder (or mixture) consists essentially of boron nitride-based aggregates, said powder having:
a) the following overall chemical composition, in percentages by weight:
  between 40 and 45% inclusive of boron,
  between 53 and 57% inclusive of nitrogen,
  less than 5%, in total, of other elements,
  a calcium content of less than 400 ppm by weight;
b) a structural composition including more than 90% inclusive of boron nitride, in percentages by weight and on the basis of the totality of the crystallized phases present in said powder, and
c) the following physical properties:
  a mean circularity of the aggregates greater than or equal to 0.90,
  a median pore size less than or equal to 0.3 µm,
  an open porosity less than or equal to 55%.

In the present invention, the elements other than O, C and N of said chemical composition, in particular, boron and calcium, are measured conventionally using the aggregate powder by inductively coupled plasma atomic emission spectrometry (ICP-AES).

In the present invention, the elements O, C and N of said chemical composition are measured conventionally using the aggregate powder by infrared spectrometry for the elements O and C and by thermal conductivity for the element N, for example, using a LECO series TC 436DR apparatus for the elements N and O and a LECO series SC 144DR apparatus for the element C.

In the present invention, said structural composition is obtained conventionally from the aggregate powder by X-ray diffraction and Rietveld refinement.

According to one embodiment, the powder is characterized by:
  the content by weight of boron is greater than or equal to 41%;
  the content by weight of boron is less than or equal to 44%;
  the content by weight of nitrogen is greater than or equal to 54%;
  the content by weight of nitrogen is less than or equal to 56%;
  the calcium content is less than 330 ppm, or less than 300 ppm by weight, preferably less than 200 ppm by weight, preferably less than 100 ppm by weight, or even more preferably less than 50 ppm by weight.

In a preferred embodiment, the content by weight of elements other than those described in said elementary chemical formulation given above is less than 4%, preferably less than 2%, preferably less than 1%, preferably less than 0.5%, preferably less than 0.1%. In said embodiment, these elements are preferably impurities, that is to say elements that are added unintentionally, for example, by the raw materials used in the feedstock, such as the elements O, C, Mg, Fe, Si, Na, K.

Preferably, the oxygen content in the powder is less than 5000 ppm by weight, preferably less than 2000 ppm by weight, or even less than 1000 ppm by weight.

In a particular embodiment, said other elements include a sintering additive for the boron nitride in a quantity preferably greater than or equal to 0.5%, preferably greater than 1% and less than 4%, preferably less than 3%, preferably less than 2%.

The sintering additive for the boron nitride is selected from $LaB_6$; the oxides of rare earths, of elements of columns 3 and 4 of the periodic table of elements and their mixtures; the nitrides of the elements of column 4 of the periodic table of elements; and their mixtures. Preferably, said sintering additive is selected from $LaB_6$, $Y_2O_3$, the nitrides of the elements Ti, Zr, Si, Al and their mixtures. Preferably said sintering additive is selected from $LaB_6$, $Y_2O_3$, the nitrides of the elements Ti, Si, Al, and their mixtures.

The powder according to the invention contains quite preferably a boron oxide $B_2O_3$ content less than 5%, preferably 2%, more preferably less than 1%, or even less than 0.5%, and quite preferably less than 0.1%.

The boron oxide $B_2O_3$ content of the powder according to the invention is measured conventionally by titration with mannitol.

In the present invention, the following are conventional meanings:
"sintering additive" for boron nitride is understood to mean a compound facilitating the sintering of said boron nitride, for example, by reducing the temperature needed for said sintering, by improving the densification or by limiting crystal growth;
"rare earth" is understood to mean an element of the group of the lanthanides plus scandium Sc and yttrium Y; and "lanthanide" is understood to mean an element having an atomic number between 57 (lanthanum) and 71 (lutetium) of the periodic table.

According to preferred embodiments of the present invention:

said structural composition includes more than 95%, preferably more than 98%, of boron nitride, in percentages by weight and on the basis of the totality of the crystallized phases present in said powder;

said structural composition includes more than 90%, preferably more than 95%, preferably more than 98%, of boron nitride, in percentages by weight and on the basis of the weight of said powder; or the boron nitride is present at more than 60%, preferably more than 70%, preferably more than 80%, or even approximately 100% in the form of a hexagonal structure, in percentages by weight and on the basis of the crystallized boron nitride phases present in said powder.

In said physical properties:

the aggregate powder has a mean circularity greater than or equal to 0.92, preferably greater than or equal to 0.93, or even greater than or equal to 0.94, or even greater than or equal to 0.95;

the aggregate powder has a median pore size less than or equal to 0.25 µm, preferably less than or equal to 0.2 µm and preferably greater than 0.05 µm; and/or the aggregate powder has an open porosity less than 53%, preferably less than 50%, preferably less than 49%, or even less than 47%, or even less than 45%.

For the evaluation of the circularity "Ci" of an aggregate P, one determines the perimeter $P_D$ of the disk D having an area equal to the surface area $A_p$ of the aggregate P in a picture of this aggregate. In addition, the perimeter $P_r$ of this aggregate is determined. The circularity is equal to the ratio $P_D/P_r$ or $$Ci = \frac{2*\sqrt{\pi A_p}}{Pr}.$$

The more elongate the shape of the aggregate is, the lower the first circularity is.

The mean circularity of an aggregate powder in the sense of the present invention corresponds to the arithmetic mean of the different values obtained for the population of aggregates constituting the powder.

All the known measurement methods for evaluating the circularity can be considered and, in particular, a manual or automated observation of photographs of the aggregate, for example, using a Morphologi® G3S apparatus marketed by the company Malvern. Such an apparatus also makes it possible to determine the mean circularity of an aggregate powder.

The median size of the pores of the aggregate powder is evaluated by mercury porosimetry according to the standard ISO 15901-1. The term "median size" of a set of pores, denoted $D_{50}$, is understood to mean the size dividing the pores of this set into a first and a second population of equal volume, these first and second populations comprising only pores having a size greater than or less than said median size, respectively.

The porosity of the aggregate powder is evaluated conventionally by mercury porosity according to the standard ISO 15901-1.

According to other preferred embodiments of the present invention:

the aggregate powder has a median size greater than 30 µm, preferably greater than 50 µm and less than 500 µm, preferably less than 400 µm, preferably less than 300 µm, preferably less than 200 µm; in an embodiment, the median size is between 40 µm and 70 µm, and in another embodiment, the median size is between 100 µm and 150 µm;

the aggregate powder has a maximum size less than 1 mm, preferably less than 750 µm;

the aggregate powder has a percentile $D_{10}$ greater than 5 µm, preferably greater than 10 µm, preferably greater than 20 µm; and/or the aggregate powder has a ratio $(D_{90}-D_{10})/D_{50}$ less than 10, preferably less than 5, or even less than 3, or even less than 2; advantageously, the pourability of the powder is improved as a result.

Preferably, the aggregates comprise randomly oriented boron nitride platelets. The properties of said aggregates are then essentially isotropic.

"Median size" of a set of aggregates (or of grains), denoted $D_{50}$, is understood to mean the size dividing the aggregates (the grains) of this set into a first and a second population of equal weight, these first and second populations comprising only aggregates (the grains) having a size greater than or less than said median size, respectively.

"Percentiles" 10 (denoted $D_{10}$), 90 (denoted $D_{90}$) and 99.5 (denoted $D_{99.5}$) is understood to mean the sizes of aggregates (the grains), corresponding to the percentages of 10%, 90% and 99.5% by weight, respectively, on the cumulative particle size distribution curve of the sizes of aggregates (the grains) of the powder, said sizes of aggregates (the grains) being classified in increasing order. According to this definition, 10% by weight of the aggregates of the powder thus have a size less than $D_{10}$ and 90% of the aggregates, by weight, have a size greater than $D_{10}$. The percentiles are determined using a particle size distribution obtained using a laser granulometer.

"Maximum size" of a powder is understood to mean the 99.5 percentile.

The particle size distribution of the powders of aggregates (of grains) according to the invention is, for example, determined by laser diffusion using a Camsizer granulometer marketed by the company Retsch technologies, without suspending said powder beforehand. From this particle size distribution, the following are conventionally determined: the median size $D_{50}$, the percentile 10 ($D_{10}$), and the percentile 90 ($D_{90}$), as well as the maximum size ($D_{99.5}$).

The resulting BN-containing aggregates (including hybrid aggregates) find use as thermally conductive, electrically insulated fillers in thermal management applications, as thermal sprayable powders, or as feed for manufacturing BN solid blocks. In one embodiment, the aggregate powder according to the invention as described above is used as filler dispersed in a polymer matrix, thereby forming a composite aggregate-polymer material.

Microelectronic devices, such as integrated circuit chips, are becoming smaller and more powerful. The current trend is to produce integrated chips which are steadily increasing in density and perform many more functions in a given period of time over predecessor chips. This results in an increase in the electrical current used by these integrated circuit chips. As a result, these integrated circuit chips generate more ohmic heat than the predecessor chips. Accordingly, heat management has become a primary concern in the development of electronic devices.

Typically, heat generating sources or devices, such as integrated circuit chips, are mated with heat sinks to remove heat which is generated during their operation. However, thermal contact resistance between the source or device and the heat sink limits the effective heat removing capability of the heat sink. During assembly, it is common to apply a layer of thermally conductive grease, typically a silicone grease, or a layer of a thermally conductive organic wax to aid in creating a low thermal resistance path between the opposed mating surfaces of the heat source and the heat sink. Other thermally conductive materials are based upon the use of a binder, preferably a resin binder, such as a silicone, a thermoplastic rubber, a urethane, an acrylic, or an epoxy, into which one or more thermally conductive fillers are distributed.

Typically, these fillers are one of two major types: thermally conductive, electrically insulative or thermally conductive, electrically conductive fillers. Aluminum oxide, magnesium oxide, zinc oxide, aluminum nitride, and boron nitride are the most often cited types of thermally conductive, electrically insulative fillers used in thermal products. BN-containing granules or aggregates (including hybrid granules or aggregates) are especially useful because they have excellent heat transfer characteristics and are relatively inexpensive.

Preferably, in the composite according to the invention, the content by weight of aggregates is greater than 20%, preferably greater than 30% and preferably less than 80%, preferably less than 70%, on the basis of the weight of the filled polymer.

In such a filled polymer, the polymer can be selected, in particular, from the thermosetting polymers, the thermoplastic polymers. Preferably, the polymer is selected from the thermosetting polymers. Also, preferably, the thermosetting polymer is selected from the epoxy resins and the silicones. The thermoplastic polymer is preferably selected from polytetrafluoroethylene or PTFE, phenylene polysulfide or PPS, polyether ether ketone or PEEK, butylene polyterephthalate or PBT, the nylons, the polycarbonates and the elastomers.

Without going beyond the scope of the invention, the powder containing boron nitride-based aggregates according to the invention can be mixed beforehand, before its introduction into said polymer, with another powder, for example, a powder of alumina aggregates. In other words, the present invention also relates to any powder mixture including the powder consisting essentially of above-described boron nitride-based aggregates.

Examples 1-4

The invention and its advantages will be better understood upon reading the embodiment examples below, which are provided only for illustrative purposes and which do not limit the present invention.

The boron nitride aggregate powder according to Comparative Example 1 is a PCTL5MHF powder marketed by Saint-Gobain Boron Nitride.

The boron nitride aggregate powder according to Comparative Example 2 is a PCTH7MHF powder marketed by Saint-Gobain Boron Nitride.

The boron nitride aggregate powder according to Comparative Example 3 is produced by using the following process: a boron nitride powder, having an oxygen content of 5% by weight, a calcium content of 100 ppm, a content of elements other than oxygen and calcium less than 1% by weight, is crushed under dry conditions in a ball mill so that it has a median size of 3 μm. The powder is pressed in the form of pellets having a diameter of 50 mm using an isostatic press at a pressure of 200 MPa. The relative density of the pellets obtained is equal to 45%. The pellets obtained are then crushed by means of a roller mill then sieved to 90 μm and to 45 μm, and finally subjected to a heat treatment under nitrogen in a cycle having a rise rate of 100° C./h at 2000° C., a holding time of 2 h at this temperature, and a descent at 300° C./h. In the end, the powder thus obtained is sieved so as to keep the particle size range between 45 μm and 90 μm.

The boron nitride aggregate powder according to Example 4, according to the present invention, is produced by the following process: a Saint-Gobain Boron Nitride PUHP30005 boron nitride powder having an oxygen content of 1% by weight, a calcium content of 100 ppm, a median size of 1 μm, is pressed in the form of pellets having a diameter of 50 mm using an isostatic press at a pressure of 200 MPa. The relative density of the pellets obtained is equal to 75%. The pellets obtained are then crushed by means of a roller mill, then ground in a ball mill in which the balls have been removed, for 1 hour, said mill rotating at a speed of 5 rpm, then sieved, with application of ultrasound, to 90 μm and to 45 μm, and finally subjected to a heat treatment under nitrogen in a cycle having a rise rate of 100° C./h at 2000° C., a holding time of 2 h at this temperature, and a descent at 300° C./h. In the end, the powder thus obtained is sieved so as to keep a particle size range between 45 μm and 90 μm.

Table 1 below lists the properties of the powders of Examples 1 to 4, after elemental, structural and physical analyses carried out by means of the techniques described above.

TABLE 1

| | 1(*) | 2(*) | 3(*) | 4 |
|---|---|---|---|---|
| Chemical analysis (weight data) | | | | |
| B (%) | 43 | 43 | 43 | 43 |
| N (%) | 56 | 56 | 56 | 56 |
| Ca (ppm) | 500 | 300 | 20 | 20 |
| other elements (%) | <1 | <1 | <1 | <1 |
| Among which O (ppm) | 1000 | 1000 | 1000 | 1000 |
| Among which C (ppm) | 100 | 100 | 100 | 100 |
| Crystallized phases present and quantity in % on the basis of the crystallized phases | | | | |
| boron nitride | 100 | 100 | 100 | 100 |
| Other physical properties | | | | |
| Circularity | 0.77 | 0.75 | 0.9 | 0.93 |
| Open porosity (%) | 57 | 50 | 58 | 48 |
| Median size of the pores (μm) | 0.75 | 0.7 | 0.16 | 0.18 |
| $D_{50}$ of the particles (μm) | 80 | 100 | 110 | 90 |

(*)not according to the invention

The boron oxide content as measured by titration with mannitol is on the order of 0.1% for all the examples.

The wear by attrition of the powders obtained according to Examples 1 to 4 is then estimated using the following test: 20 g of aggregate powder passing through the mesh openings of a sieve with 90 μm openings and not passing through the mesh openings of a sieve with 45 μm openings are placed in a closed nylon container, so that said powder occupies 45% of the volume of said container. The container is then stirred for 120 minutes at a rotational speed of 20 rpm in a jar turner. After the test, the weight of the particles passing through the mesh openings of a sieve with 45 μm openings is determined. It corresponds to the quantity of fine particles created in the test. This quantity of fine particles generated, or "wear by attrition," is expressed as percentage of the weight of the powder before the test. The higher said quantity of fine particles generated during the test is, the greater the wear by attrition of the aggregate powder is.

A wear by attrition greater than 20% is believed to lead to an appreciable decrease of the thermal conductivity of the filled polymer comprising said aggregates. Preferably, the wear by attrition is less than 15%, preferably less than 10%.

The decrease of the wear by attrition of an aggregate powder A in comparison to an aggregate powder B is equal to the difference between the wear by attrition of powder A and the wear by attrition of powder B, divided by the wear by attrition of powder A, expressed as percentages, powder A being the powder considered as reference.

The powders obtained according to Examples 1 to 4 are then used as filler in an ordinary polymer matrix of the TSE3033 silicone resin type marketed by Momentive Performance Materials. The inclusion and the dispersion of the aggregates in the polymer matrix are carried out according to the following protocol:

Each powder is dispersed in the TSE3033 silicone resin (the two parts A and B of the resin being mixed in equal quantity, by weight) at ambient temperature in a Rayneri VMI Turbotest mixer marketed by the company VMI, at a speed of rotation of 200 revolutions per minute. The weight of powder introduced is equal to 40%, on the basis of the sum of the weight of the TSE3033 silicone resin and the weight of the powder. Each mixture thus obtained is then cast so as to obtain a film having a thickness of 5 mm. Said film is then heated at a temperature of 100° C. for a time period of 2 hours.

Measurements of the through plane thermal conductivity are carried out on each polymer film obtained, the "through plane," in English, thermal conductivity designating the thermal conductivity measured along the direction perpendicular to the polymer film, in other words measured along the thickness of said film.

The measurements are carried out according to the following standards and experimental protocols:

The thermal conductivity is given conventionally as the product of the diffusivity, the density and the thermal capacity.

More particularly, according to the invention, the "through plane" thermal conductivity is measured as the product of the through plane thermal diffusivity, of the density and of the thermal capacity.

The thermal diffusivity of the polymers is measured according to the standard ASTM C-518 using the thermal flow method. The diffusivity is measured perpendicularly to the polymer layer (through plane thermal diffusivity).

The thermal capacity of the polymers is measured by differential scanning calorimetry, in English, (DSC) using a Netzsch thermobalance.

The density of the polymers is measured by helium pycnometry.

The improvement of the thermal conductivity of a filled polymer comprising an aggregate powder A compared to a filled polymer comprising an aggregate powder B is equal to the difference between the thermal conductivity of the filled polymer comprising powder B and the thermal conductivity of the filled polymer comprising powder A, divided by the thermal conductivity of the filled polymer comprising powder A, expressed as percentages (the filled polymer comprising powder A being the reference filled polymer).

The results of the wear by attrition tests of the aggregate powders and of the thermal conductivity measurements are given in the following Table 2:

TABLE 2

| Example | Circularity | Open Porosity (%) | Mean Pore Size (μm) | Calcium Content (ppm) | Wear by Attrition (%) | Decrease of Wear by Attrition† (%) | Thermal Conductivity of Filled Polymer (W/m · K) | Improvement of Thermal Conductivity‡ (%) |
|---|---|---|---|---|---|---|---|---|
| 1(*) | 0.77 | 57 | 0.75 | 500 | 31 | — | 0.5 | — |
| 2(*) | 0.75 | 50 | 0.7 | 300 | 23 | 26 | 0.8 | 60 |
| 3(*) | 0.9 | 58 | 0.16 | 20 | 25 | 19 | 0.5 | 0 |
| 4 | 0.93 | 48 | 0.18 | 20 | 7 | 77 | 1 | 100 |

†Compared to Powder of Example 1
‡Compared to Polymer Filled with Powder of Example 1
(*)Not according to the invention The data given in Table 2 show that the powder of boron nitride based aggregates according to the invention has a measured wear by attrition of 7% and that the filled polymer obtained from the powder of boron nitride based aggregates according to the invention has a through plane thermal conductivity that is much higher than that of all the other samples.

More specifically, the aggregate powder according to Example 1 in accordance with the teaching of the document WO2014/136959 does not reach the desired compromise. In particular, the wear by attrition appears higher than that of Example 4 of the present invention.

The best compromise is also not reached by the aggregate powder according to Example 2 (not according to the invention) and for the filled polymer comprising said powder. Although lower than that of Example 1, the wear by attrition of the aggregate powder is still too high. However, the thermal conductivity of the filled polymer comprising said powder is substantially higher (by 60%) than that of the filled polymer comprising the powder according to Example 1.

As for the aggregate powder according to Example 3 (not according to the invention), which includes no calcium, and the filled polymer comprising said powder, one notes that the wear by attrition of the aggregate powder is still too high and that the thermal conductivity of the filled polymer comprising said powder is not improved in comparison to that of the filled polymer comprising the powder according to Example 1.

The best results and compromise are obtained for the aggregate powder according to Example 4 according to the present invention and the filled polymer comprising said powder. The wear by attrition of the aggregate powder is limited to only 7%, that is to say much lower than the wear by attrition of the aggregate powders of Comparative Examples 1, 2 and 3. The thermal conductivity of the filled polymer comprising the aggregate powder according to Example 4 is, in particular, on the order of twice that of the filled polymer comprising the powder according to Example 1 and, in absolute value, it is the highest of all the samples tested.

A comparison between the aggregate powders of Examples 1 and 4 thus makes it possible to demonstrate the significant improvement obtained according to the invention by a specific adjustment of the parameters of open porosity, calcium content, circularity of the aggregates, and mean pore size.

In particular, in regard to the teaching of the above-described prior publication WO2014/136959, the applicant company has demonstrated the cumulative impact of the decrease of the mean pore size, the decrease of the calcium content, the decrease of the open porosity, and the increase of the circularity on the properties of resistance to attrition and thermal conductivity of the filled polymer comprising said powders.

In particular, if one compares the Examples 1 (according to WO2014/136959) and 4 (according to the invention), one notes that:

the wear by attrition decreases from 31% to 7%, which corresponds to a 77% decrease; and the thermal conductivity of the filled polymer increases from 0.5 to 1 W/m·K and is improved by 100%.

Unexpectedly, in view of the better compromise obtained by means of their adjustment according to the present invention, the inventors thus have demonstrated a true synergy between the properties of circularity, open porosity, mean pore size and calcium content.

Examples 5-8

Granulation was carried out in high shear mixers in a batch process consisting of a bowl equipped with a multi blade impeller and a scraper. The feed powder, Saint-Gobain Boron Nitride PUHP30005 boron nitride powder, was dry mixed before the process to ensure homogenous starting conditions of each batch.

Binder was then added either at the beginning or gradually during the process. Binder can be added in a drop by drop fashion or sprayed on. An additional step of powder dusting can be added to improve the sphericity and the density of the granules. Finally, the wet mixing stage is followed by a drying stage.

Particle Size Distribution and Spherical Coefficient (Camsizer):

Camsizer XT (Horiba, Japan) was used to obtain the particles size distribution (d10, d50 and d90) of the granules and the shape (sphericity coefficient).

Morphology (SEM):

The granule morphology was observed on a SEM TM-1000 (Hitachi High-Technologies Co, Japan).

Porosity:

Porosimeter Autopore IV (Micromeritics, United-States) was used for mercury porosimetry measurements.

Example 5—Boron Nitride Granulation

In 106 g of deionized water were dissolved 1.1 g of polyethylene glycol 20M and 2.9 g of Tergitol NP10. The resulting solution is designated as the granulation solution.

290 g of boron nitride powder (PUHP30005, Saint-Gobain) were introduced in a 1 liter high shear granulator.

The impeller rotation speed was set at 30 m/s. During the first 60 seconds, the granulation solution was added continuously to the powder. During the next 180 seconds, the boron nitride was granulated. Then, the granulation was stopped and the BN granules were dried during 24 h at room temperature before a firing at 2050° C.

The final granules have a mean diameter of 250 μm, a sphericity of 0.97, and a porosity of 54%.

Example 6—Boron Nitride Granulation with Dusting

In 106 g of deionized water were dissolved 1.1 g of polyethylene glycol 20M and 2.9 g of Tergitol NP10. The resulting solution is designated as the granulation solution.

290 g of boron nitride powder (PUHP30005, Saint-Gobain) were introduced in a 1 liter high shear granulator. 58 g of the same powder was prepared in a beaker and designated as dusting powder.

First step: The impeller rotation speed was 30 m/s. During the first 60 seconds, the granulation solution was added continuously to the powder. During the next 180 seconds, the boron nitride was granulated.

Second step: At 240 seconds, the impeller rotation speed was turned down to 3 m/s. During the next 160 seconds, the dusting powder, boron nitride powder (PUHP30005, Saint-Gobain), was added continuously.

Then, the granulation was halted and the BN granules were dried during 24 h at room temperature (see FIG. 1) before firing at 2050° C. The final granules have a mean diameter of 224 μm, a sphericity of 0.99, and a porosity of 52%.

Example 7—Hybrid Boron Nitride Granulation

In 78.19 g of deionized water were dissolved 0.81 g of polyethylene glycol 20M and 2.3 g of Tergitol NP10. The resulting solution is designated as the granulation solution.

232 g of boron nitride powder (PUHP30005, Saint-Gobain) and 58 g of A 16SG alumina powder (Almatis, Ludwigshafen, Germany) were introduced in a 1 liter high shear granulator.

The impeller rotation speed was set at 30 m/s. During the first 20 seconds, the powders were mixed together without liquid introduction. Then during the next 60 seconds, the granulation solution was added continuously to the powder. During the next 180 seconds, the boron nitride and alumina were granulated to form hybrid granules. Then, the granulation was halted and the BN/$Al_2O_3$ granules were dried during 24 h at room temperature before a firing at 1800° C.

The final granules have a mean diameter of 275 μm, a sphericity of 0.95, and a porosity of 40%.

Example 8—Hybrid Boron Nitride Granulation

In 78.19 g of deionized water were dissolved 0.81 g of polyethylene glycol 20M and 2.3 g of Tergitol NP10. The resulting solution is designated as the granulation solution.

232 g of boron nitride powder (PUHP30005, Saint-Gobain) and 58 g of Elkem Microsilica Grade 920 silica powder were introduced in a 1 liter high shear granulator.

The impeller rotation speed was set at 30 m/s. During the first 20 seconds, the powders were mixed together without liquid introduction. Then during the next 60 seconds, the granulation solution was added continuously to the powder. During the next 180 seconds, the boron nitride and silica were granulated to form hybrid granules. Then, the granulation was turned off and the BN/$SiO_2$ granules were dried during 24 h at room temperature before a firing at 1600° C.

The final granules have a mean diameter of 163 μm, a sphericity of 0.98, and a porosity of 49%.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A powder, consisting essentially of boron nitride-based aggregates, wherein the aggregates comprise:
   boron nitride in a hexagonal structure; and
   a mean circularity of at least 0.90,
   wherein the powder has a calcium content of less than 400 ppm by weight.

2. The powder of claim 1, wherein the boron nitride-based aggregates have a median size less than 500 microns.

3. The powder of claim 1, wherein the boron nitride-based aggregates have an oxygen content of less than or equal to 2% by weight.

4. The powder of claim 1, wherein the boron nitride-based aggregates comprise:
   a median pore size less than or equal to 0.3 microns,
   an open porosity less than or equal to 55%; or
   any combination thereof.

5. The powder of claim 1, wherein the powder comprises in percentages by weight:
   between 40 and 45% inclusive of boron;
   between 53 and 57% inclusive of nitrogen; and
   less than 5%, in total, of other elements.

6. The powder of claim 1, wherein the powder comprises a structural composition including more than 90% inclusive of boron nitride, in percentages by weight and on the basis of the totality of the crystallized phases present in the powder.

7. The powder of claim 1, wherein the powder comprises a content by weight of boron is greater than or equal to 41% and a content by weight of boron is less than or equal to 44% and impurities of less than 4%.

8. The powder of claim 7, wherein the powder comprises a content by weight of nitrogen greater than or equal to 54% and less than or equal to 56%.

9. A composition, comprising a polymer and the powder of claim 1.

10. A powder, consisting essentially of boron nitride-based aggregates, wherein the aggregates comprise:
    boron nitride in a hexagonal structure; and
    a mean circularity of at least 0.90,
    wherein the boron nitride-based aggregate comprises an open porosity less than 49%.

11. The powder of claim 10, wherein the boron nitride-based aggregates comprise the open porosity of less than 45%.

12. The powder of claim 10, wherein the boron nitride-based aggregates comprise a median pore size less than or equal to 0.25 microns.

13. The powder of claim 10, wherein the boron nitride-based aggregates comprise a mean circularity greater than or equal to 0.93.

14. The powder of claim 10, wherein the boron nitride-based aggregates comprise a median size greater than 30 microns and less than 500 microns.

15. The powder of claim 10, wherein the boron nitride-based aggregates comprise:
    a maximum size less than 1 mm;
    a percentile D10 greater than 5 microns;
    a ratio (D90-D10)/D50 less than 10; or
    any combination thereof.

16. The powder of claim 10, wherein the boron nitride-based aggregates comprise a maximum size less than 750 microns.

17. The powder of claim 10, wherein the boron nitride-based aggregates comprise randomly oriented boron nitride platelets.

18. The powder of claim 10, comprising an oxygen content less than 5000 ppm by weight.

19. The powder of claim 10, comprising a content by weight of a sintering additive greater than or equal to 0.5% and less than 4%.

20. The powder of claim 10, comprising in percentages by weight and on the basis of the crystallized boron nitride phases more than 60% of boron nitride present in a form of a hexagonal.

* * * * *